UNITED STATES PATENT OFFICE.

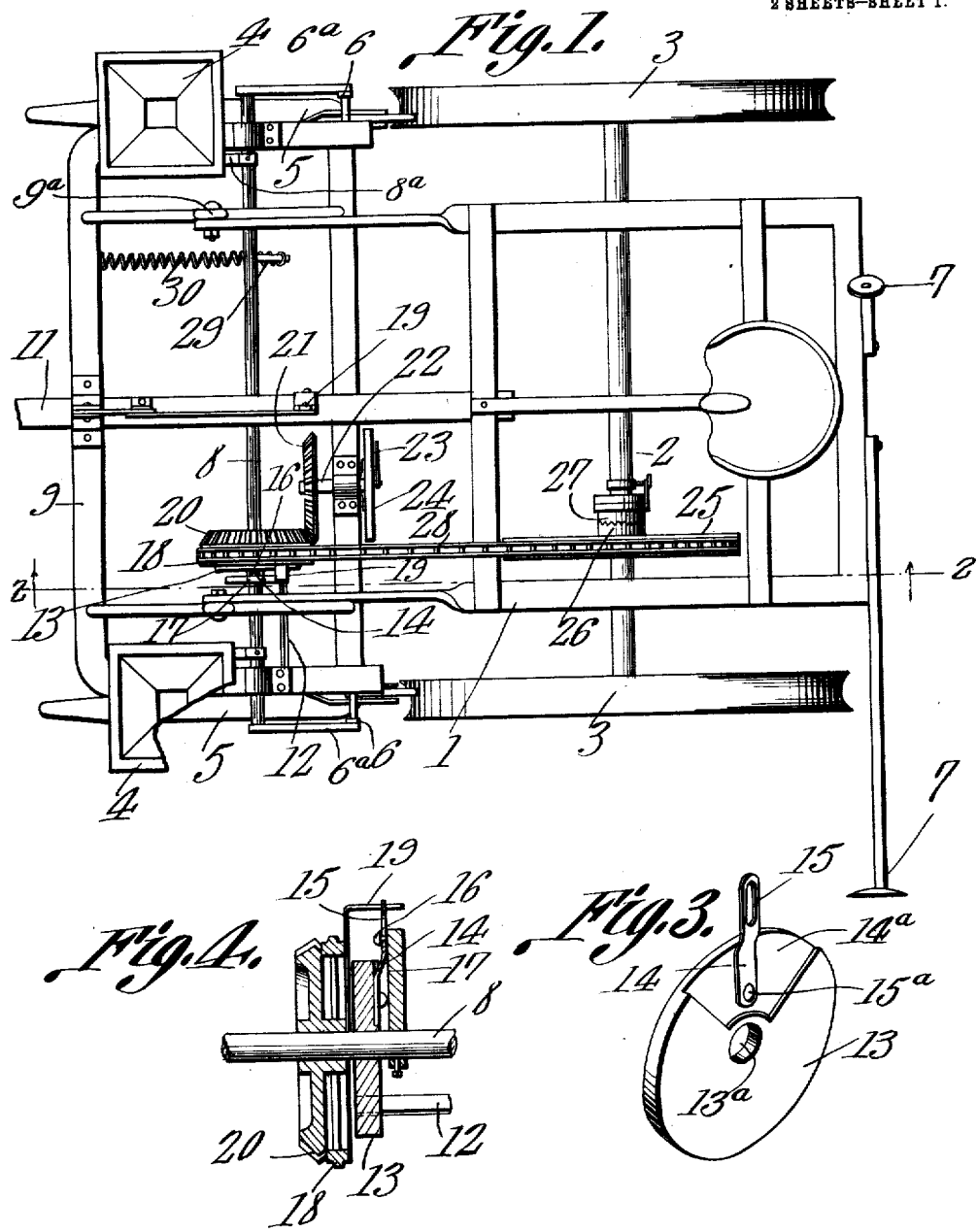

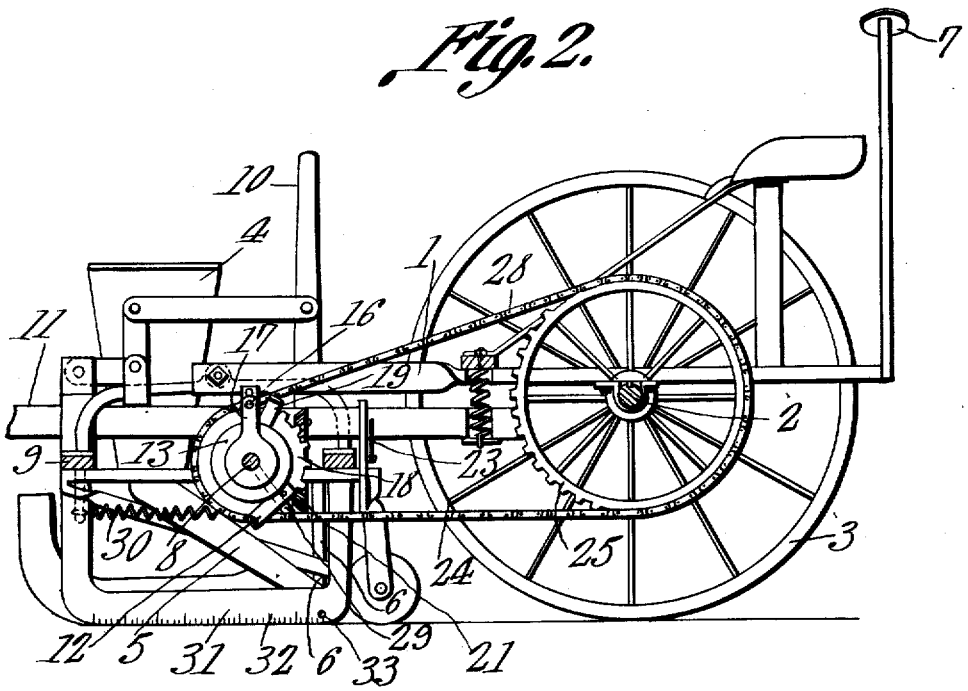
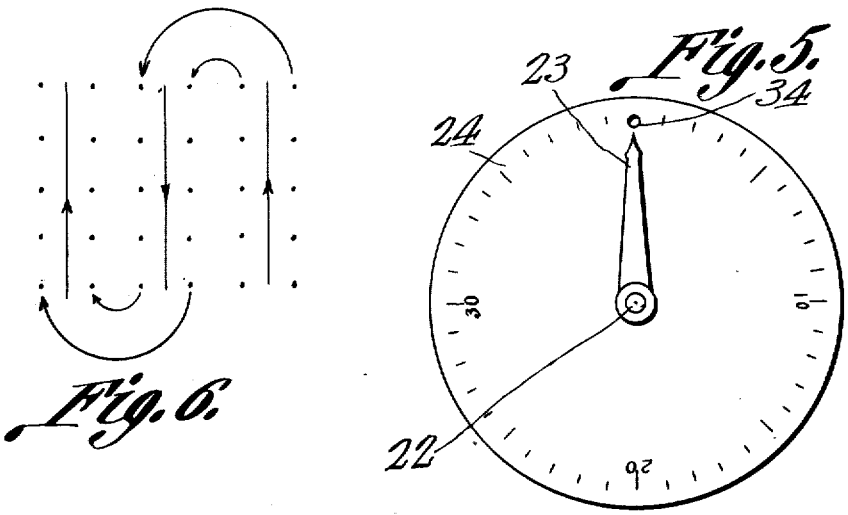

DANIEL McATEE, OF HURON, SOUTH DAKOTA.

WIRELESS CHECK-ROW PLANTER.

1,012,396.  Specification of Letters Patent.  Patented Dec. 19, 1911.

Application filed November 5, 1910. Serial No. 590,878.

*To all whom it may concern:*

Be it known that I, DANIEL MCATEE, a citizen of the United States, residing at Huron, in the county of Beadle and State of South Dakota, have invented a new and useful Wireless Check-Row Planter, of which the following is a specification.

This invention has relation to check row planters of that type commonly known as wireless and consists in the novel construction and arrangement of its parts hereinafter shown, described and claimed.

The object of the invention is to provide for a planter of the character indicated a check row indicating mechanism which will reveal to an operator the operative extent or condition of the seed separating and dropping mechanism and also to provide means for advancing the operative condition of the seed separating and dropping mechanism in order that the proper check row may be maintained and established when a planter turns at the end of a row and starts in upon a new row.

In the accompanying drawings:—Figure 1 is a top plan view of the planter. Fig. 2 is a longitudinal sectional view of the same on the line 2—2 of Fig. 1. Fig. 3 is a perspective view of the disk used upon the planter. Fig. 4 is a sectional view of portion of a transmission mechanism used upon the planter. Fig. 5 is a face view of an indicator used upon the planter. Fig. 6 is a plan view indicating the relative arrangement of planted hills as accomplished with the planter.

The planter to which the check row device is applied may be of any approved or usual pattern and consists of a frame 1 mounted upon an axle 2 which in turn is supported upon traction wheels 3. Seed boxes 4 are located upon the forward portion of the frame directly above the runners and tubes 5 of usual form. Hill markers 6 are carried by the frame 1 and are adapted to operate in the soil at the sides of the hills in which the grain is deposited in the usual manner and row markers 7 of usual form are carried by the frame 1. A shaft 8 is journaled for rotation upon the forward portion of the frame 1 and is operatively connected as at 8$^a$ with the seed separating and dropping devices carried by the seed boxes 4 and the said shaft is also operatively connected at 6$^a$ with the hill markers. The forward portion of the planter frame is in the form of a section 9 which is pivotally or hingedly connected at 9$^a$ to the remainder of the planter frame and a lever mechanism 10 is mounted upon the tongue 11 and is operatively connected with the section 9 whereby it may be raised or lowered with respect to the remaining portion of the planter frame as usual in machines of this character. An arm 12 fixed to the section 9 carries a disk 13 pierced with an axial hole 13$^a$ in which the shaft 8 is journaled and in one face of this disk is formed a sector-shaped recess 14$^a$ as seen in Fig. 3. Within such recess at its smaller end and near the axis 13$^a$ of the disk, a tappet 14 is mounted on a pivot 15$^a$ so that its body may swing from side to side in the recess, and the outer end of this tappet which projects beyond the periphery of the disk is provided with a longitudinal slot 15 wherein is loosely received a pin 16 attached to the side of a crank arm 17 which in turn is fixed to the shaft 8 alongside the disk. A sprocket wheel 18 is loosely journaled upon the shaft 8 at the other side of the disk and is provided with a finger 19 which extends over the edge of the disk 13 and in the path of movement of which the outer end of the tappet 14 lies. The sprocket wheel 18 is provided upon one side with a beveled gear wheel 20 which meshes with a beveled gear wheel 21 fixed to a stub shaft 22. The stub shaft 22 is journaled upon the planter frame section 9 and is provided at its rear end with an indicator or pointer 23. A dial 24 surrounds the rear end portion of the stub shaft 22 and is held in fixed position with relation to the frame section 9. The dial is provided with a series of suitable marks or graduations over which the pointer or indicator 23 passes in the manner as will be hereinafter explained. A sprocket wheel 25 is journaled upon the axle 2 and is provided with a clutch hub 26. A clutch member 27 is slidably mounted upon the axle 2 and is adapted to be moved into engagement with the clutch hub 26 of the sprocket wheel 25 whereby the said sprocket wheel is caused to rotate in unison with the axle 2. A sprocket chain 28 passes around the sprocket wheels 18 and 25 and is adapted to transmit rotary movement from the said wheel 25 to the said wheel 18. An arm 29 is fixed to the shaft 8 and a coil spring 30 is connected at one end with the said arm 29 and at its other end with the forward portion of the frame section 9. The spring 30 is under tension with a tendency to hold the outer end portion of the arm 29 toward the forward end of the frame section 9 and the said spring and arm are adapted to serve as return devices for the shaft 8 to cause the same to assume a normal position as will be explained hereinafter. An approximately U-shaped runner 31 is fixed to the intermediate portion of the frame section 9 and is located in a plane parallel with the vertical plane of the runners 5 and midway between the said runners. The runner 31 is provided upon its sides with graduations 32 which correspond in number to the graduations upon the dial 24 and the runner 31 is provided with a perforation 33 located at the rear end of the series of graduations and is in transverse alinement with the hills previously planted in a field when the planter is in operation and the parts are manipulated as will be explained hereinafter. The dial 24 is also provided with a perforation 34 or its equivalent to which the indicator 23 will point when the seed is dropped and a hill is formed in the field.

In operation, as the planter is drawn across a field, and the clutch member 27 is in engagement with the clutch hub 26 of the sprocket wheel 25, rotary movement is transmitted from the axle 2 to the sprocket wheel 18 as hereinbefore described. As the wheel 18 turns upon the shaft 8 the finger 19 is carried around until it comes in contact with the outer end of the tappet 14. The said tappet is then swung upon its pivotal connection 15ª with the disk 13 and the edge of the slot 15 bearing against the side of the pin 16 swings the crank arm 17, whereby the shaft 8 is partially rotated until the finger 19 passes off the end of the tappet. Then the tension of the spring 30 comes into play and the shaft 8 is swung back to its original or normal position. This movement on the part of the shaft 8 operates the seed separating and dropping devices and the hill markers in the manner as above indicated. While the planter is moving across the field and the clutch member 27 is in engagement with the clutch hub 26 of the sprocket wheel 25 the sprocket wheel 18 is rotated continuously and the gear wheel 20 in mesh with the gear wheel 21 rotates the shaft 22 and this carries the finger or indicator 23 over the face of the dial 24. As hereinbefore stated, when the indicator 23 is over the perforation 34, the seed is dropped and the hill is formed and marked. Consequently an operator may readily ascertain how near or remote the seed dropping operation may be and should he desire to retard the operation it is necessary only to disengage the clutch member 27 from the hub 26 of the sprocket wheel 25 when the said sprocket wheel and its connected parts will assume a state of rest and the planter may continue to move across the field. If the operator should desire to advance the seed dropping operation, the clutch member 27 is disengaged from the clutch hub 26, and the operator will then manually turn the stub shaft 22 or shaft 8 until the seed dropping operation has been advanced to the desired extent when the clutch member 27 is moved back into engagement with the clutch hub 26 of the sprocket wheel 25 and the seed dropping operation is automatically resumed. When the planter moves along the initial row being formed in the field, one of the row markers 7 is lowered in order that a line may be formed in the soil over which the runner 31 may move when the planter returns back across the field.

When the planter arrives at the end of a row and it is desired to turn the same and continue the planting operation with the hills arranged in check row transversely across the field, or transversely to the course in which the planter moves over the field, the planter is turned and the runner 31 permitted to move across the first check row of hills. However, prior to this, the clutch member 27 is disengaged from the clutch hub 26 of the sprocket wheel 25 and therefore the seed dropping operation is interrupted. The operator observes which of the graduations 32 upon the runner 31 lies in alinement with the first check row of hills and turns the indicator 23 over the face of the dial 24 until the said indicator is over the graduation upon the said dial which corresponds with the graduation upon the runner 31 which is in alinement with the first check hill. The operator then throws the clutch member 27 into engagement with the clutch hub 26 of the wheel 25 and the planter is started back along the return row. When the perforation 33 in the runner 31 passes across the first check row the seed dropping operation has advanced to such an extent that the seed is deposited in the soil in transverse alinement with the hills previously planted in the preceding rows.

Having described the invention, what I claim as new and desire to secure by Letters Patent is:

1. The combination with a planter, a runner on its frame having a series of graduations, a dial on the frame in sight of the driver and having graduations corresponding with those on said runner, an indicator coacting with the dial, a wheel connected with the indicator, driving mechanism connecting said wheel with the axle of the planter, and a clutch within said mechanism; of a shaft on which said wheel is loosely mounted, connections between the shaft and the seed-dropping mechanism, a spring for turning the shaft in one direction, a crank arm fast on the shaft, a finger on said wheel, and means for connecting the finger with the arm during part of each revolution of said wheel.

2. The combination with a planter, a runner having a series of graduations, a dial in sight of the driver and having graduations corresponding with those on said runner, an indicator coacting with the dial, a wheel connected with the indicator, driving mechanism connecting said wheel with the axle of the planter, and a clutch within said mechanism; of a shaft on which said wheel is loosely mounted, connections between the shaft and the seed-dropping mechanism, a spring for turning the shaft in one direction, a crank arm fast on the shaft, a finger on said wheel, a tappet pivoted to a fixed support and having a slot, said finger engaging and moving the tappet during part of each revolution of said wheel, and a pin in the crank arm engaging said slot.

3. The combination with a planter, a runner having graduations, a dial having graduations, an indicator coacting with the dial, a wheel connected with the indicator, driving mechanism connecting said wheel with the axle of the planter, and a clutch within said mechanism; of a shaft on which said wheel is loosely mounted, connections between the shaft and the seed-dropping mechanism, a crank arm fast on the shaft, a finger on said wheel, a fixed disk between the wheel and arm and having a sector-shaped recess, a tappet pivoted therein near said shaft and having its outer end projecting beyond the disk and slotted, said finger moving around the disk during each revolution of said wheel and at one point striking and turning the tappet on its pivot, and a pin in said crank arm engaging the slot in the tappet.

In testimony that I claim the foregoing as my own, I have hereto affixed my signature in the presence of two witnesses.

DANIEL McATEE.

Witnesses:
B. F. STARKWEATHER,
LUTHER ARMSTRONG.

---

Copies of this patent may be obtained for five cents each, by addressing the "Commissioner of Patents, Washington, D. C."